Nov. 18, 1958 W. J. PRESMYK 2,860,459
TOOL GRINDING MECHANISM
Filed June 6, 1958
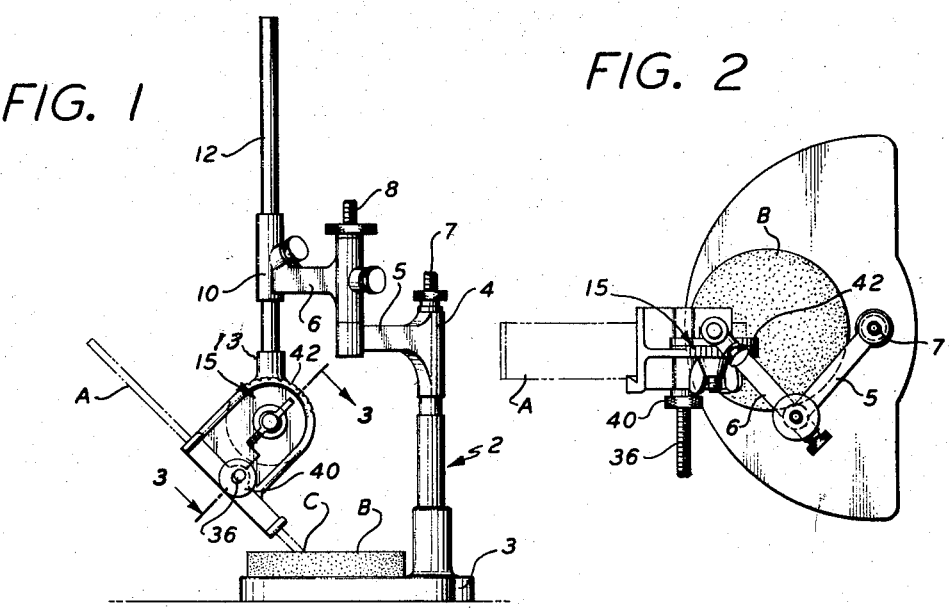
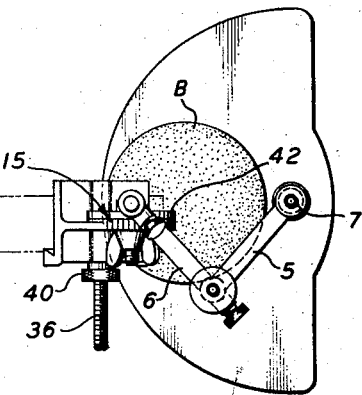
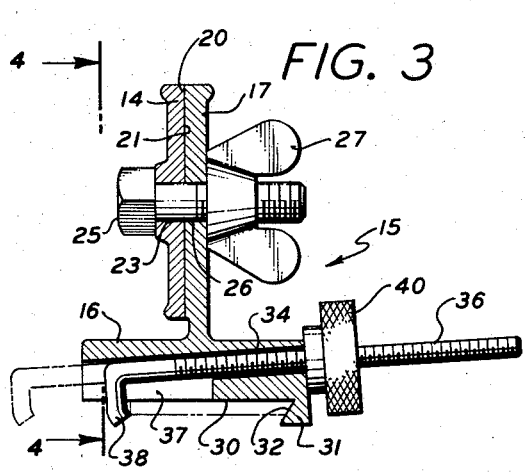
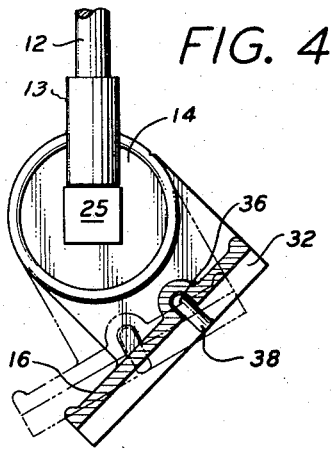
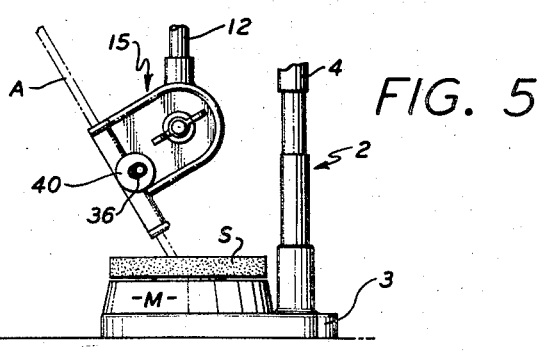
INVENTOR.
Wally J. Presmyk
BY
Scott L. Norvies
ATTORNEY

United States Patent Office 2,860,459
Patented Nov. 18, 1958

2,860,459

TOOL GRINDING MECHANISM

Wally J. Presmyk, Phoenix, Ariz.

Application June 6, 1958, Serial No. 740,333

3 Claims. (Cl. 51—221)

This invention concerns a tool grinding mechanism.

One of the objects of the invention is to provide a tool holder which is adapted for use on a parallel motion mechanism.

Another object is to provide a tool holding chuck which will easily hold all common edged tools, such as chisels, plane blades and the like at any predetermined angle so that the tool may be made to contact a grinding stone at a predetermined angle; this chuck being attachable to a portion of a device which will move the chuck over an area of a polishing stone in a flat horizontal plane.

Still another object is to provide a tool holding chuck having a body adapted to engage one side of the tool and a hook on a threaded rod which is adapted to hold the opposite side of the tool and draw it into a groove on the first side mentioned.

Other objects will appear hereinafter.

I attain the foregoing objects by means of the devices, parts and combinations of parts shown in the accompanying drawings, wherein—

Figure 1 is a side elevational view of the tool holding chuck and parallel motion device;

Figure 2 is a plan view thereof;

Figure 3 is a sectional elevational view of the tool holding chuck as it would appear on line 3—3 of Figure 1 and drawn on an enlarged scale;

Figure 4 is a side elevational view of the tool holding chuck also drawn on an enlarged scale and with portions sectioned off along line 4—4 of Figure 3; and Figure 5 is a side elevational view of the tool holding chuck shown in combination with a stone mounted on a motor to secure mechanical motion to said stone.

Similar numerals refer to similar parts in the several views.

The parallel motion device 2 has a base 3, vertical upright member 4 and swingable arms 5 and 6 supported on vertical bearings 7 and 8, respectively.

At the outer end of arm 6 there is a sleeve 10 which has a vertical bore that will slidably and rotatively hold the vertical shaft 12.

The lower end of shaft 12 is attached to vertical boss 13 on attaching plate 14.

Plate 14 has a vertical friction face 21 which bears on vertical friction face 20 of the vertical plate 17 extending upward from the chuck body 15. Attaching plate 14 has a transverse bore 23 which admits the shank of bolt 25.

The vertical chuck body plate 17 is provided with a bore 26 which admits the shank of attaching bolt 25. Nut 27 on bolt 25 draws the head of the bolt and attaching plate 14 toward the face 20 of vertical chuck body plate 17.

On the under face of base 16 of chuck body 15 there is a flattened area 30 against which tools to be ground are held. This flattened area is bounded on one side by a lip 31. This lip is formed so that an outwardly and upwardly slanting undercut groove 32 extends fore and aft along the inner face of the lip. This forms an undercut groove which will hold the edges of tools to be ground in place on the face 30.

A hole 34 is drilled transversely through the chuck base 16. The outer end of this hole is cut out so that it forms a groove 37 reaching to the face 30. A tool holding clamp screw 36 extends through the hole 34 on the side adjacent lip 31 and may be retained in the grooved left hand portion 37. This screw has a hook 38 at the end which is retained in groove 37 and is threaded at the opposite end to receive the tightening nut 40. It is to be noted that hole 34 is drilled at a slight angle relative to the face 30 of the body 16. This causes the hook 38 to approach the edge of tools held on the face and in groove 32 with an inwardly and upwardly directed force. Thus, the free edge of the tools is held tightly upwardly against face 30 while the opposite edge is bedded into groove 32.

The rounded edges of plate 14 and of the upwardly extending plate 17 may be marked with indicia as shown at 42 in Figures 1 and 2. These indicia may be used to set the chuck body with reference to the plate 14 at the same place each time the device is used. These two parts are then held in position by tightening nut 27 on bolt 25. In this way the angle of the face 30 of the chuck may be definitely established and set. The tool to be sharpened, marked A, in Figures 1, 2, and 5, may then be placed against face 30 and the screw 36 tightened by means of nut 40. This will hold the body of the tool and by setting the chuck part 17 in the proper relation to plate 14 the edge of the tool to be sharpened may be made to bear on stone B at the same angle each time the device is used.

After the tool is set at the correct angle the edge C of the tool is moved back and forth, or to and fro over the upper face of stone B for grinding. At the same time the complete chuck is free to move vertically by reason of the sliding action of rod 12 in sleeve 10. This motion is at right angles to the face of stone B and, therefore, the angle which the edge C bears to the face of the stone will be maintained.

In the modified form shown in Figure 5, the tool A is held in the chuck 15 the same as above, however, the stone S is mounted on a motor M which rotates the stone at a pre-determined proper speed. Therefore, it is not absolutely necessary to move the stone by hand but merely to position and hold it while the stone rotates.

I claim:

1. In tool sharpening mechanism, a base having a flat grinding stone on its upper face, an upright standard on said base and a hinged horizontal arm with a vertical hole in its free end and a vertical shaft slidable in said hole to provide horizontal motion at a plurality of levels at the lower end of said shaft, a tool holding chuck attached to the lower end of said shaft consisting of a boss and attaching plate having a finished vertical face, with a centrally disposed bolt hole, attached to the lower end of said shaft, a chuck body having a transverse opening and a flat under face and a vertical plate with a vertical friction face bearing on the face of said attaching plate and having a centrally disposed bolt hole, a bolt extending through the holes in said adjacent plates and a nut holding them together with frictional engagement, a lip formed along one edge of the under face of the chuck body having an under cut inner face to hold the side edge of a tool to be ground, and a clamp screw in the transverse opening in the base of the chuck body having a hook to engage the edge of a tool to be ground opposite to the edge held in said under cut groove of said lip, and a nut on said screw adapted to draw said hook toward the under cut groove in said lip.

2. A tool grinding mechanism for edge tools including a supporting device having a hinged arm to provide motion in any horizontal direction, a base and a grinding stone on said base, a sleeve at the free end of said arm having a vertical hole and a shaft operating vertically and rotatively in said sleeve, a vertical boss attached to the lower end of said shaft, said boss having a vertical attaching plate with a finished face and a central hole, a chuck having a substantially horizontally extending body and a vertical plate extending upwardly from the upper face of said body having a finished face mating the finished face on the plate on said lug and having a central opening, a bolt and nut extending through the openings in said plates to draw said plate faces into frictional engagement and provide a pivotal support for said chuck body on said boss plate, said chuck body having a flat lower face to receive tools to be sharpened and a lip along a side edge with a grooved undercut inner face to receive and support the side edges of tools bedded on the under face of said body, and a transverse hole extending upwardly at an angle through said body and lip and opening into a transverse slot in the portion of said face opposite said lip, and a clamp screw extending through said transverse hole having a hook at one end slidable in the groove in the under face of the body and a nut threaded on the opposite end of said screw adapted to bear on the outer face of said lip and draw said hook upward toward the lower face of said chuck body and transversely toward the groove of said lip.

3. A tool grinding mechanism having a base, a grinding stone thereon, a standard extending upwardly therefrom, a double hinged arm on said standard slidably supporting a vertical shaft, a tool holding chuck having a body pivotally attached to the lower end of said shaft; said chuck body having a flat under face, a lip having an angular undercut edge adjacent said body face and a transverse slot and hole, and a clamp screw having a hook at its outer end operating in said slot and a threaded inner end provided with a nut bearing on the outer side edge of said body and drawing said hook toward the groove in said lip to clampably hold tools to be sharpened upward against said body face and transversely into said lip groove.

References Cited in the file of this patent

UNITED STATES PATENTS

| 1,350,951 | Artmaier | Aug. 24, 1920 |
| 2,165,929 | Lentz | July 11, 1939 |
| 2,578,309 | Kroczek | Dec. 11, 1951 |